3,504,481
AIR FILTERING SYSTEM
Agop G. Zakarian, 41—46 50th St., Woodside, N.Y. 11377, and Nishan Balikjian, 5800 Arlington Ave., Bronx, N.Y. 10471
Filed Dec. 11, 1967, Ser. No. 695,544
Int. Cl. B03c 3/36; B01d 47/00
U.S. Cl. 55—122    4 Claims

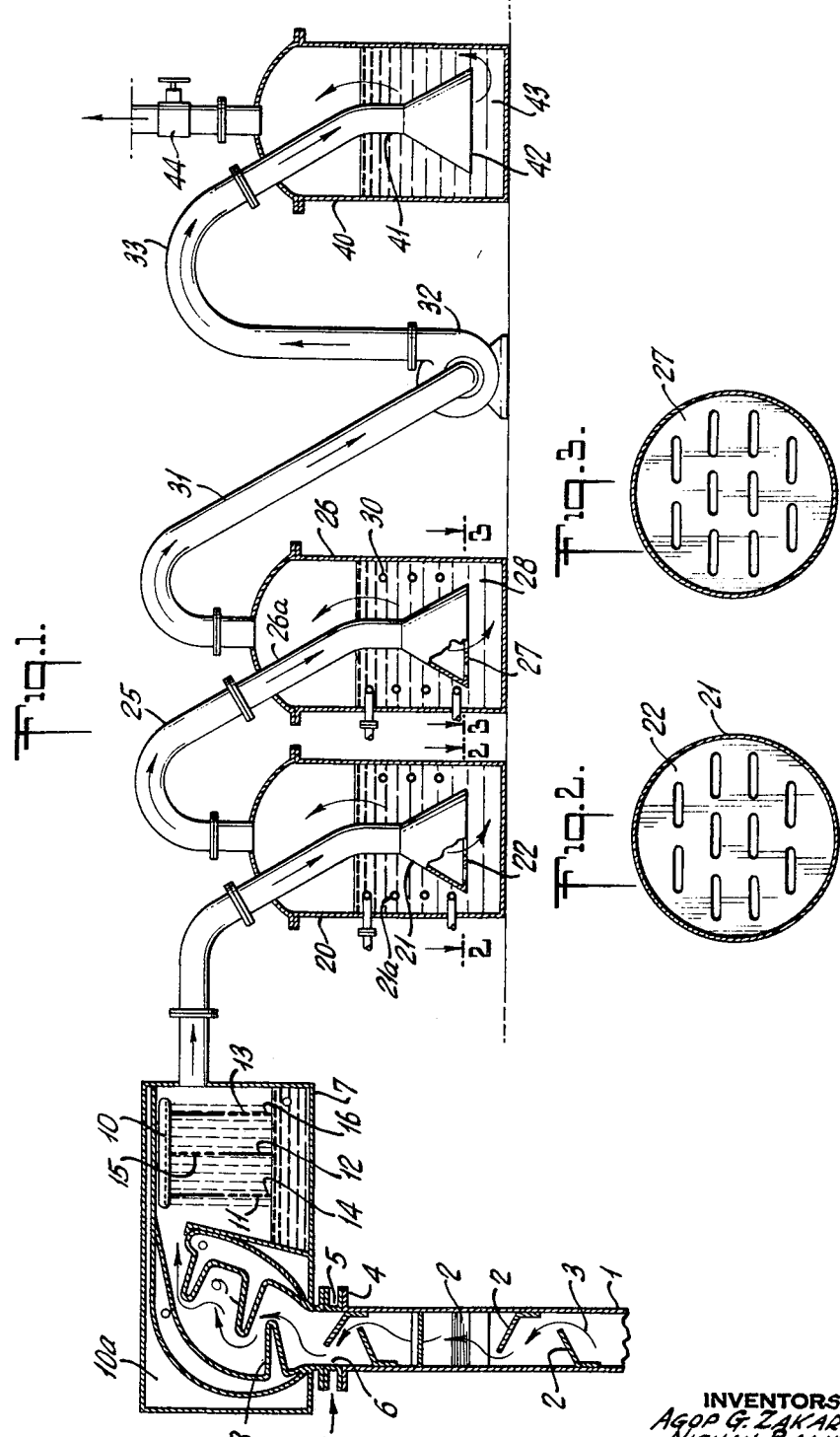

ABSTRACT OF THE DISCLOSURE

Polluted air, smoke and etc., is first forced through an elongated path wherein electrostatic and/or electromagnetic devices intercept and collect carbon-like particles within the polluted air stream and deposits them onto a depository. The polluted air, smoke, etc., is thereafter purified by passing it through a cold-water forced spray and into a cooled solution of sodium carbonate ($Na_2CO_3$) to remove grease or soot from the polluted air or smoke. The air is thereafter passed through a cooled creosote-based solution for removing the carbon and sulphur content of the smoke. Thereafter, the smoke is passed into a compressor for compressing the smoke to approximately 5–7 atmospheres and thereafter exited into a pressurized enclosure three-fourths filled with water where any residual pollutants remaining in the smoke are removed and the residue pure air exited into the air or ambient surroundings.

---

This invention relates to an air-filtering system and in particular to a method for filtering polluted air, smoke and the like by means of mechanical and chemical devices.

Air pollution caused by incomplete combustion creates untold damage and hardship to people and property, destroys plant life and creates a considerable hazard to the general health of people. The products of incomplete combustion are, in the main, carbon and carbon derivatives and to a degree sulphur and sulphur derivations. Smoke contains small air-borne and gas-borne particles consisting essentially of carbon-like materials in sufficient quantity to be observable and an agglomeration of such particles forms soot. It is the gaseous product of incomplete combustion or organic substance, such as wood, coal, tobacco, and is in the main made up chiefly of particles of unburned carbon which settle as soot.

It is the principal purpose and object of the invention to provide an apparatus for purifying air, smoke and other polluted atmospheric gases.

Another object of the invention is to provide an apparatus for purifying air which is simple, efficient, economical and effective.

A still further object of the invention is to provide an air-filtering apparatus combining the use of mechanical and chemical devices.

A still further object of the invention is to provide an air-filtering apparatus which substantially removes all pollutant particles from polluted air and renders the air in a pure and healthy form.

Other objects and advantages will become apparent from a reading of the specifications and a study of the accompanying drawings which form part of the specifications and illustrate merely by way of example embodiments of the invention.

FIGURE 1 shows a diagrammatic view of the air pollution purifying process according to the invention.

FIGURES 2 and 3 show sections of flared tubing and the configuration of apertures at the termination thereof.

Now describing the invention in detail, there is shown in the said FIGURE 1 an apparatus for the purification of polluted air and comprises an elongated type smoke stack 1, having interval spaced cantilever-type baffles or flaps 2 disposed at angles in the upward direction at staggered intervals to present an elongated path for the polluted air stream 3. The upper portion of said stack has a support channel 4 traversing the outer portion thereof and disposed to attach to a similar channel 5 attached to the outer portion of an extended stack 6 attached to a cooling chamber 7. The chamber 7 is an insulated elongated type enclosure having its length disposed in a direction orthogonal to the stack 1 when attached thereto.

The cooling chamber 7 comprises a series of special cantilever-type fins or sections 8 and 9 spirally disposed on opposing sides and interleaved to present a further elongated path for the polluted air of smoke when in motion. The object for creating the elongated path for the smoke is to give an opportunity for electrostatic and/or electromatic traps along the stack chamber, shown schematically at 10a, to remove and otherwise to trap out the heavy solid and burnt particles contained in the smoke or polluted air. Further, the elongated path provides an opportunity for cooling, not possible otherwise. The trapped solids can, after trapping, be removed or allowed to fall by gravity in any suitable container for reburning or removal entirely. Further, the lengthy winding path of the polluted air gives such air an opportunity to cool down to as much as ambient or room temperature.

It is also possible to provide centrifugal blowers along the elongated smoke stack 1 so as to further cause the deposit of soot and other deleterious particles.

The polluted air thereafter is thus wetted or washed by a spray of water 10 under pressure, the air made to pass a series of vertically oriented spaced screens 11, 12 and 13 arranged to have apertures 14, 15 and 16, respectively, each at opposing extremities to the other to permit the polluted air flow along an otherwise elongated path. The wetted polluted air is thus forced into a series of cleansing chambers for chemical treatment and further purification.

In particular, the air is first forced into a chamber 20 through a funnel-like device 21, the expanded opening 22 thereof terminating into a disc having elongated apertures as shown in FIGURE 2. The polluted air flows thereafter into a solution of sodium carbonate ($Na_2CO_3$) 22a or in the alternative of 10% solution of sodium hydroxide (NaOH) which has been previously cooled to about 32 degrees F. by a helix-type coil 21a through which a suitable coolant is forced, such as water, Freon, ammonia solution and the like. The object of this particular step is to remove the grease and/or soot from the polluted air or smoke remaining therein. The grease or soot reacts with the chemical in its cooled state to solidify the residue pollutants in the smoke.

The air thereafter, which flows to the top of the enclosure 20, is passed through a conduit 25 which terminates in a second liquid-filled enclosure 26 into a funnel-like device 26a, as described previously. The expanded funnel opening 27 of funnel 26a terminates into another apertured disc, as shown in FIGURE 3. The air thereafter flows into a bath or solution 28 containing a creosote-based fireproofing material for removing or retaining the components of carbon and/or sulphur remaining or forming in part of and in the polluted air. Here, again, the solution 28 remains cooled to approximately 32 degrees F. via a coolant material passing through a cooling coil 30 contained within the said solution 28. The air thereafter is passed through a conduit 31 and into a centrifugal compressor device 32 wherein the air is raised to a pressure of about five to seven atmospheres. Finally, the high-pressured air is transmitted through a conduit 33 from compressor 32 into a final enclosure 40 containing water. The conduit 33 agains terminates into a funnel-like device 41 whose wide opening 42 terminates in a water bath 43, the air filtering through said water which becomes in part $H_2CO_3$ and into the atmosphere through an exit pressure valve 44 as pure air void and free of any pollutants or irritants.

What is claimed is:

1. An air pollution control apparatus comprising in combination:

(a) an enclosure means including a polluted air inlet and a treated air outlet, an elongated spiral passageway operatively constructed and arranged within said enclosure between said inlet and said outlet in such a manner that air flowing from said inlet to said outlet must pass through said passageway, said passageway being operatively constructed and arranged for entrapping and removing pollutants from polluted air as it flows from said inlet to said outlet;

(b) electrostatic trap means operatively constructed and arranged in operative relationship with and along said passageway for electrostatically removing from said air heavy carbon soot particles;

(c) apertured screens operatively constructed and arranged within said enclosure between said passageway and said outlet in such a manner that air passing from said passageway to said outlet must pass through said screens, said screens screening said air as it passes from said inlet to said outlet, said screens having operatively associated therewith a water spray means operatively constructed and arranged to spray cooling water under pressure into said air as it passes from said inlet to said outlet for cooling said air, (d) a first chamber means having a first chamber air inlet and a first chamber air outlet and containing a solution of sodium carbonate, first conduit means operatively constructed and arranged for passing air from said outlet of said enclosure to said first chamber means air inlet and into contact with said solution, said first chamber receiving air from said enclosure means through said conduit means for removing additional pollutants from said air, cooling means operatively associated with said first chamber means for cooling said solution;

(e) a second chamber means having a second chamber air inlet and a second chamber air outlet and containing creosote particles in solution, second conduit means operatively constructed and arranged for passing air from said first chamber air outlet to said second chamber air inlet and into contact with said creosote particles in solution, said second chamber means receiving air from said first chamber through said second conduit means for removing additional pollutant particles in the air, cooling means operatively associated with said second chamber for cooling said creosote particles in solution;

(f) an air pressurizing means having an air inlet and an air outlet, said pressurizing means being operatively constructed and arranged for increasing the air pressure to a pressure above atmospheric pressure, third conduit means operatively connecting said second chamber air outlet to said air inlet of said pressurizing means for passing air from said second chamber to said pressurizing means; and (g) a water bath chamber having an air inlet and an air outlet, said water bath chamber containing a water bath, a fourth conduit means operatively constructed and arranged for passing air from said pressurizing means outlet to said water bath chamber inlet and into contact with said water bath for bathing air pressurized by said pressurizing means, an exit valve operatively associated with said air outlet from said water bath chamber for controlling the flow of air out of said water bath chamber, and discharge means operatively associated with said water bath chamber and including said valve for discharging air from said water bath chamber to the ambient surroundings as purified air.

2. An air pollution control apparatus according to claim 1 wherein said elongated passageway includes spaced apart, opposingly stacked with respect to each other fins supported by and along the sides of said passageway in cantilevered manner.

3. An air pollution control apparatus according to claim 1 wherein each of said screens have an apertured portion only at a single extremity thereof, each of said screens being oriented so as to have the said apertured portion at the end furthest away from the apertured portion of the next adjacent screen.

4. An air pollution control apparatus according to claim 1 wherein each of said chambers respectively include a funnel-like device operatively associated with the respective air inlet to the respective chamber for receiving air from the respective conduit means operatively associated with the respective air inlet for receiving air and discharging air through an enlarged terminus of each said funnel-like device into the liquid in the respective chamber.

References Cited

UNITED STATES PATENTS

| | | | |
|---|---|---|---|
| 280,549 | 7/1883 | Yaryan | 261—22 X |
| 334,158 | 1/1886 | Beard | 55—279 X |
| 1,044,531 | 11/1912 | Hunter | 23—2 X |
| 1,264,511 | 4/1918 | Hechenbleikner | 55—122 |
| 1,302,281 | 4/1919 | Bates. | |
| 1,911,211 | 5/1933 | Stelz | 55—152 X |
| 1,934,472 | 11/1933 | Allen et al. | |
| 2,109,019 | 2/1938 | Wilmowsky | 55—256 X |
| 2,612,745 | 10/1952 | Vecchio | 55—256 X |
| 2,761,755 | 9/1956 | Brown | 23—2 |
| 3,103,426 | 9/1963 | Lantz | 55—256 X |
| 3,266,224 | 8/1966 | Ferretti | 55—241 |

FOREIGN PATENTS 898,436   7/1944   France.

DENNIS E. TALBERT, JR., Primary Examiner

U.S. Cl. X.R.

23—2; 55—126, 127, 223, 228, 233, 235, 240, 256, 417, 442, 447, 315; 110—119; 261—121, 106, 113; 266—15